(12) United States Patent
Boillot

(10) Patent No.: US 8,354,997 B2
(45) Date of Patent: Jan. 15, 2013

(54) TOUCHLESS USER INTERFACE FOR A MOBILE DEVICE

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 1203 days.

(21) Appl. No.: 11/930,014

(22) Filed: Oct. 30, 2007

(65) Prior Publication Data

US 2008/0100572 A1    May 1, 2008

Related U.S. Application Data

(60) Provisional application No. 60/855,621, filed on Oct. 31, 2006.

(51) Int. Cl.
*G06F 3/033* (2006.01)
*G09G 5/08* (2006.01)

(52) U.S. Cl. ......................................................... 345/158

(58) Field of Classification Search .......... 345/156–184; 715/863
See application file for complete search history.

(56) References Cited

U.S. PATENT DOCUMENTS

| | | | |
|---|---|---|---|
| 5,059,959 A * | 10/1991 | Barry | 345/168 |
| 5,168,531 A * | 12/1992 | Sigel | 382/291 |
| 5,274,363 A | 12/1993 | Koved | |
| 609,592 A | 8/2000 | Goyzk | |
| 6,130,663 A | 10/2000 | Null | |
| 6,137,427 A | 10/2000 | Binstead | |
| 6,313,825 B1 | 11/2001 | Gilbert | |
| 6,747,578 B1 * | 6/2004 | Lam et al. | 341/22 |
| 6,937,227 B2 | 8/2005 | Qamhiyah | |
| 7,078,911 B2 | 7/2006 | Cehelnik | |
| 7,081,884 B2 | 7/2006 | Kong | |
| 7,092,109 B2 | 8/2006 | Satoh et al. | |
| 712,658 A1 | 10/2006 | Breed | |
| 7,130,754 B2 | 10/2006 | Satoh | |
| 7,414,705 B2 | 8/2008 | Boillot | |
| 7,620,316 B2 | 11/2009 | Boillot | |
| 7,725,288 B2 | 5/2010 | Boillot | |
| 7,834,847 B2 | 11/2010 | Boillot | |
| 7,847,787 B1 | 12/2010 | Boillot | |
| 2001/0054114 A1 | 12/2001 | DuVal | |
| 2002/0126090 A1 | 9/2002 | Kirkpatrick | |
| 2002/0191029 A1 | 12/2002 | Gillespie | |
| 2003/0063775 A1 | 4/2003 | Rafii | |
| 2003/0132913 A1 | 7/2003 | Issinski | |
| 2004/0178995 A1 * | 9/2004 | Sterling | 345/173 |
| 2004/0239622 A1 | 12/2004 | Proctor | |
| 2005/0166163 A1 | 7/2005 | Chang | |
| 2005/0210020 A1 | 9/2005 | Gunn | |
| 2005/0212750 A1 | 9/2005 | Marvit | |
| 2005/0257174 A1 | 11/2005 | Wilson | |
| 2006/0010400 A1 | 1/2006 | Dehlin | |

(Continued)

*Primary Examiner* — Sumati Lefkowitz
*Assistant Examiner* — Robert E Carter, III

(57) ABSTRACT

A sensory device (200) for providing a touchless user interface to a mobile device (100) is provided. The sensory device can include at least one appendage (210) having at least one sensor (220) that senses a finger (232) within a touchless sensing space (101), and a connector (230) for communicating sensory signals received by the at least one sensor to the mobile device. The sensory device can attach external to the mobile device. A controller (240) can trace a movement of the finger, recognize a pattern from the movement, and send the pattern to the mobile device. The controller can recognize finger gestures and send control commands associated with the finger gestures to the mobile device. A user can perform touchless acquire and select actions on or above a display or removable face plate to interact with the mobile device.

8 Claims, 12 Drawing Sheets

U.S. PATENT DOCUMENTS

| | | |
|---|---|---|
| 2006/0050061 A1* | 3/2006 | Aiken et al. ............... 345/173 |
| 2006/0161871 A1 | 7/2006 | Hotelling |
| 2006/0164241 A1 | 7/2006 | Makela |
| 2006/0224429 A1 | 10/2006 | Mathew |
| 2006/0256090 A1 | 11/2006 | Huppi |
| 2007/0127039 A1 | 6/2007 | Njolstad |
| 2008/0005703 A1* | 1/2008 | Radivojevic et al. ......... 715/863 |
| 2009/0106655 A1 | 4/2009 | Grant |

* cited by examiner

KEYPAD ARRANGEMENT

SENSOR ELEMENT ANALYSIS

Length of <OAB = Time of flight for Rx 121

Length of <OBC = Time of flight for Rx 141

DISPLAY ARRANGEMENT

GAME CONTROL ARRANGEMENT

TOUCHLESS USER INTERFACE FOR A MOBILE DEVICE

CROSS-REFERENCE TO RELATED APPLICATION

This application claims the priority benefit of U.S. Provisional Patent Application No. 60/855,621 entitled "Touchless User Interface for a Mobile Device" filed Oct. 31, 2007, the entire contents of which are hereby incorporated by reference.

FIELD

The present embodiments of the invention generally relate to the field of communication devices, more particularly to user interfaces for communication devices.

BACKGROUND

Mobile communication devices such as cell phones generally include a keypad and display for allowing a user to interact with mobile device applications. A user can navigate through menus presented on the display of the mobile device by pressing one or more keys on a keypad. Some keypads include a navigation pad which allows a user to navigate menus on the keypad in an ergonomic manner. Mobile devices, such as cell phones or portable music players, are generally limited in size, and thus have small keypads. The small size of the keypad can limit the ease at which users can type on the small keypad, or navigate menus on the display via a keypad, to interact with the mobile device. Such keypads have keys with a touching area that is generally smaller than the size of a user's fingertip. The keypad and the navigation pads are touch-based which require physical user interaction. That is, a user must physically touch the keypad or navigation pad to navigate through a menu system on the display.

SUMMARY

One embodiment of the invention are directed to a communication device accessory for providing a touchless user interface. The accessory can generate a two-dimensional or three-dimensional touchless sensory space. The accessory can adjust at least one control of the mobile device in response to a finger movement in the touchless sensory space. The accessory can include a control unit for associating at least one finger movement with a control action, wherein the control action is an acquire, a select, or a release. The control unit can identify a finger movement of the finger in a region of the touchless sensory space, associate the finger movement with a user interface control on a display of the mobile device, and perform a control action in response to the finger movement. Touchless user interface control can begin by a physical touching of the device, a starting-up of a visual display, an opening of the device, a starting-up of an application, or a voice command.

Another embodiment is directed to a sensory device for providing touchless user interaction to a mobile device. The sensory device can include at least one appendage having at least one sensor that senses a finger within a touchless sensing space, and a connector for communicating sensory signals received by the at least one sensor to the mobile device. The sensory device can attach external to the mobile device. A controller can be included to trace a movement of the finger, recognize a pattern from the movement, and send the pattern to the mobile device. The controller can recognize finger gestures and send control commands associated with the finger gestures to the mobile device. A user can also perform touchless acquire and select actions to interact with the mobile device.

The sensory device is suitable for use as a touchless user interface to a communication device and can include a first array of sensors on a first appendage and a second array of sensors on a second appendage structurally attached to the first appendage. The first array and the second array can produce a touchless sensory space that projects along a surface of the communication device and above the communication device. A controller operatively coupled to the first array and the second array can interpret sensory signals from the sensors, determine a finger location and movement in the touchless sensing space, and generate one or more command actions to control a user interface of the communication device according to the finger location and movement.

In another embodiment a sensing system can include the sensing device and a removable face plate with displayed user interface controls, suitable for attachment to the communication device. The controller can project a sensing field onto a surface of the removable face plate in accordance with the displayed user interface controls such that a finger positioning or movement on a user interface control on the surface of the removable face plate corresponds to at least one command action to control a portion of the user interface of the communication device. The removable face plate can detachably snap to the communication device, and can include as example displayed media controls for volume, equalization, song selection, stop, play, pause, fast forward, rewind, next, forward and other media controls. The removable face plate can also include an electronic element that identifies the face plate from one or more different removable face plates. The controller responsive to identifying a different removable face plate can determine a layout of the displayed user interface controls associated with different removable face plate to support different user interface applications.

In another embodiment, a removable face plate with displayed user interface controls, suitable for attachment to a communication device, can include an electronic element that identifies the removable face plate and a layout of user interface controls presented on the removable face plate. A sensing device, operatively coupled to the removable face plate and communication device, upon identifying the removable face plate, can project a sensing field onto the removable face plate in accordance with the layout of user interface controls. A positioning or movement of a finger on a user interface control of the removable face plate can invoke a command action to control a user interface of the communication device. The sensing device can provide sensory user interface controls for controlling the communication device in accordance with the user interface controls presented on the removable face plate. The communication device can be a cell phone, media player, personal digital assistant, or laptop.

BRIEF DESCRIPTION OF THE DRAWINGS

The features of the embodiments of the invention, which are believed to be novel, are set forth with particularity in the appended claims. Embodiments of the invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
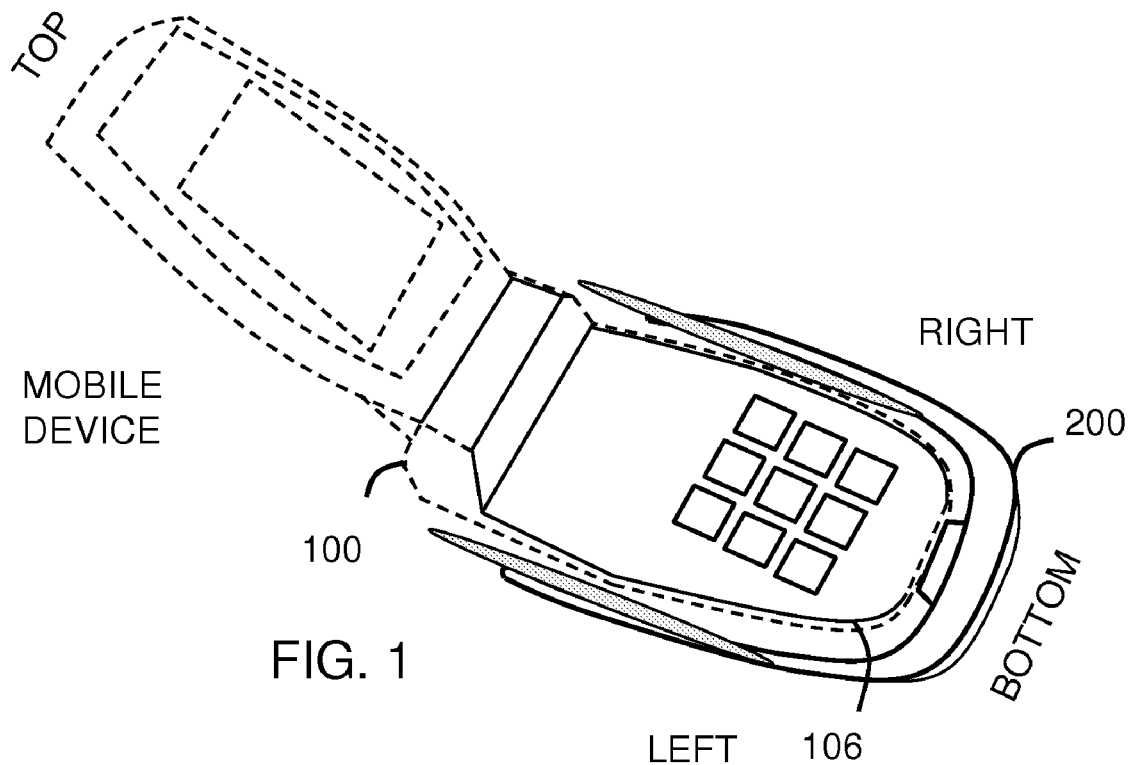
FIG. 1 is an accessory to a mobile device for providing a touchless user interface in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system.

The term "space" can be defined as exhibiting a three-dimensional aspect. The term "sensory space" can be defined as a three-dimensional volume. The term "field" can be defined as exhibiting a two-dimensional or three-dimensional aspect. The term "control" can be defined as a handle to an object which can adjust one or more attributes or references to the object. The term "control action" can be defined as a button press, a soft-key press, a selection, a scroll, an entry for activating a control. The term "menu" can be defined as a list of items or options. The term "jitter movement" can be defined as a brief localized motion. The term "absolute location" can be defined as a one to one mapping of a first location to a second location. The term "relative location" can be defined as a second location in relation to a first location, or a displacement in a sensory space. The term "acquire" can be defined as creating a handle to an object. The term "select" can be defined as selecting an object that has been acquired. The term "handle" can be defined as a reference to an object. The term "touchless" can be defined as not requiring physical contact. The term "touchless control" can be defined as a control that can be handled and selected without requiring touching of an object, although actual physical contact may be made One embodiment is directed to a sensory device suitable for providing a touchless user interface to a mobile device. Referring to FIG. 1, an accessory 200 for providing a touchless user interface to a communication device 100 is shown. The accessory 200 can provide a touchless user interface that allows a user to interact with the communication device 100 via touchless finger gestures. The accessory 200 allows a user to control one or more user interface functions of the mobile device through touchless or touch based finger movement. The accessory 200 can structurally attach, and detach, from the communication device 100. As shown, the accessory does not need to be permanently coupled to the communication device 100, and can be considered in one embodiment as an accessory. In an alternate embodiment, the sensory aspects can be integrated within a periphery or display of the communication device 100. The communication device 100 may be a cell phone, a portable music player, a media player, a memory storage unit, a security device, a personal digital assistant, laptop, or any other suitable communication device.

The accessory 200 can project the sensing space 101 above the communication device 100 or along a surface of the communication device 100. In one arrangement, the sensing space 100 can be projected on the surface of a graphical user interface of a display of the communication device 100. The sensing space 101 can effectively convert a non-touchscreen display to a virtual touchscreen display. For example, the graphical user interface controls on the surface of the communication device 100 can be mapped to locations in the sensing space 100 thereby allowing a user to touch portions of the display and generate user control actions. Different user interface applications on the display of the communication device 100 can be synchronized with virtual user interface controls in the sensing space 101. In such regard, the accessory 200 can provide touchscreen functionality to the display.

In another arrangement, the communication device 100 can support removable touch-panels or face plates 106 on which the sensory space 100, or sensory field, is projected. As an example, the removable touch panel 106 can be a plastic snap-on cover that includes printed graphic controls corresponding to one or more virtual controls of the sensing space 100. Different snap-on covers can be used to effectuate different graphical user interface controls. For example, separate removable covers, or GUIs can be used for text messaging, email, dialing, Internet, contacts, and voice mail. A user performing a finger movement at a location on the removable touch panel 106 corresponds to a finger action in the sensing space 101. The accessory 200 can be customized to project virtual controls on the removable face plate 106. The removable face plate can detachably snap to the communication device, and as example, can include displayed media controls for at least one among volume, equalization, song selection, stop, play, pause, fast forward, rewind, next, and forward. The removable face plate can also include an electronic element, passive component or magnetic component that identifies one or more different removable face plate. In such regard, a user can switch face plate covers to switch between applications.

Figure 2:
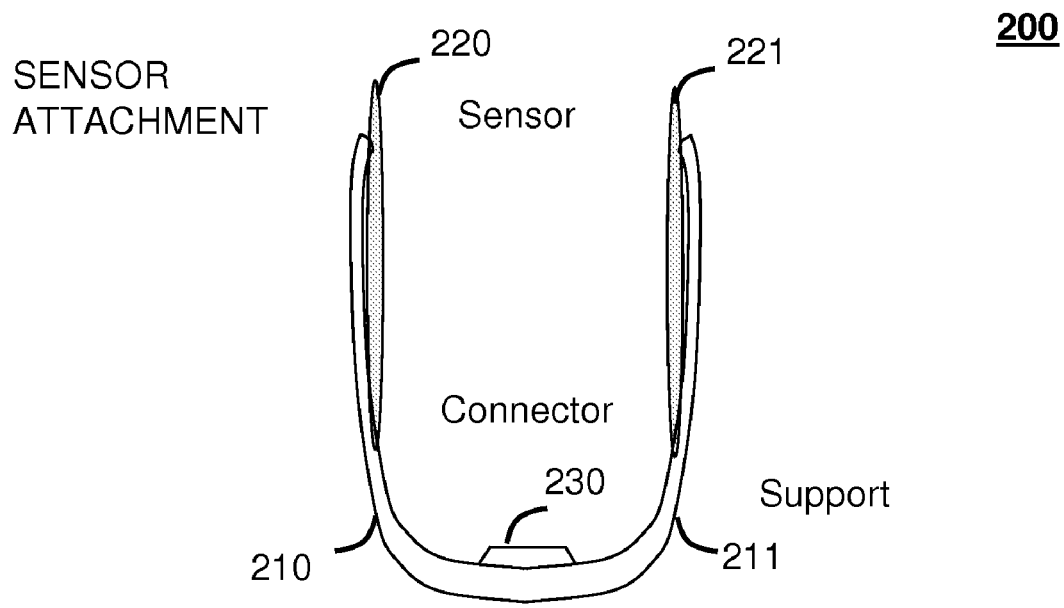
FIG. 2 is the mobile device accessory of FIG. 1 in greater detail in accordance with an embodiment of the inventive arrangements.

Referring to FIG. 2, the accessory 200 can include at least one appendage 210 having at least one sensor 220 that senses an object within a touchless sensing space of the accessory 200. As illustrated, the accessory 200 can include a first appendage 210 on a left side, and a second appendage 211 on the right side. The first appendage can include a first sensor 220, and the second appendage 221 can have a second sensor 221. The first sensor 220 and the second sensor 221 can create a sensing space. The first appendage 210 and second appendage 220 can also be in an "L" configuration. As shown, the first appendage 210 and the second appendage 211 can be structurally connected as a single rigid piece. In such regard, the first sensor 220 and the second sensor 221 are at a fixed and unchanging location relative to one another. The first appendage and the second appendage can be integrated around the display of the communication device 100, and a controller (see FIG. 10) can selectively project the sensing space along a surface of the communication device and also above the communication device.

The accessory 200 can also include a connector 230 for coupling to the mobile device. The connector 230 can provide a physical signaling interface to the communication device 100. The interface connector can be operatively coupled to the controller for providing structural support for the first and second appendage, wherein the interface connector is attachable to the communication device 100. As an example, the connector 230 can support RS-232 serial programming functionality, USB programming functionality, or Bluetooth functionality. The accessory 200 can communicate finger tracking information to the mobile device via the connector 230.

Figure 3:
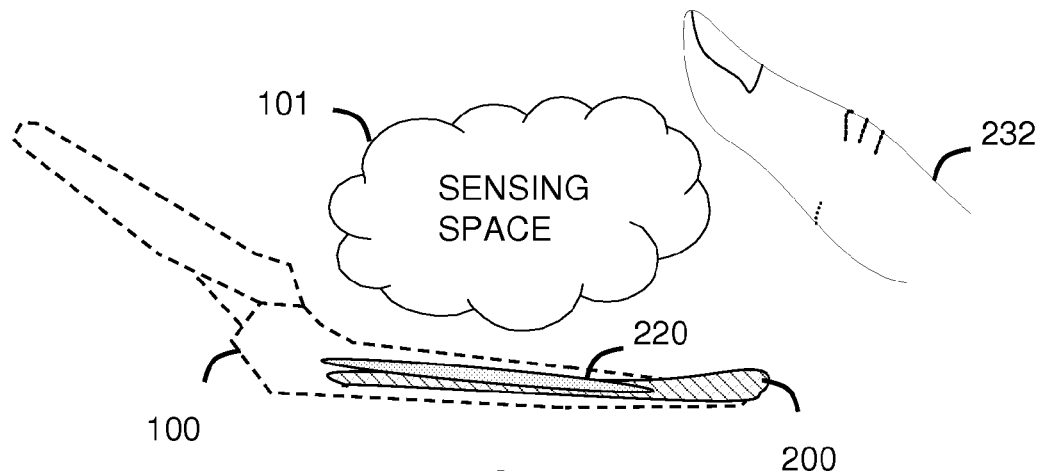
FIG. 3 is a side view of the mobile device accessory of FIG. 1 in a keypad arrangement illustrating a touchless sensing space in accordance with an embodiment of the inventive arrangements.

Referring to FIG. 3, an exemplary sensing space 120 created by the accessory 200 is shown. In one arrangement, the first appendage 210 and the second appendage 211 can be positioned around a keypad of the mobile device, such that a user interacts with the mobile device over the keypad area by moving a finger in the touchless sensing space, without touching the keypad. The accessory 200 can detect a presence of a finger in the sensing space 120, and track a movement of the finger in the sensing space 120. In one arrangement, the accessory 200 can fit along a periphery of the communication device 100 thereby exposing the keypad and the display in an unobtrusive manner. In such regard, the first appendage 210 and the second appendage 211 are positioned along a left side and a right side of the communication device 100. In this manner, the user can perform standard touch based sensing on a keypad or a display of the communication device 100.

The user can also initiate touchless sensing when the sensing space 120 is created by the accessory 200. In practice, a user can initiate touchless control by pressing a soft-key on the mobile device, or through a voice command. The accessory 200 can also include a voice recognition system, or have access to a voice recognition system on the mobile device, for recognizing voice commands. Upon initiating touchless control, the accessory 200 can create the sensing space 101 for allowing a user to interact with the mobile device via touchless finger gestures or movements.

Figure 4:
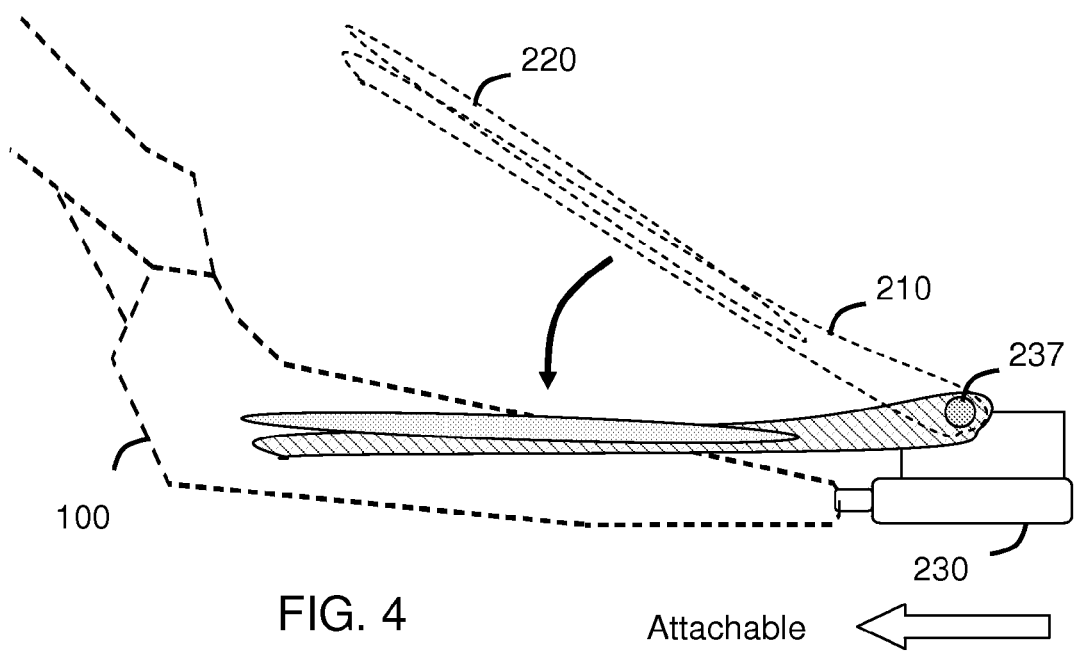
FIG. 4 is a side view of the mobile device accessory of FIG. 1 illustrating various orientations for creating a sensory space in accordance with an embodiment of the inventive arrangements.

Referring to FIG. 4, the connector 230 is shown in greater detail. The connector 230 can be structurally attachable and detachable to the communication device 100. The connector 230 can contain mechanical parts (not shown) to secure the accessory 200 to the communication device 100. For example, a pin and lock mechanism can securely fasten the connector to the phone as is known in the art. A pin out in the connector (not shown) can provide electrical coupling between the accessory 200 and the communication device 100. For example, the connector can provide at least transmit, receive, and ground signal paths between the communication device 100 and the accessory 200. The connector can provide electrical coupling through a serial port interface, a USB interface, or a Bluetooth interface. In the latter, an electrical coupling between the accessory 200 and the mobile device is provided by a Radio Frequency (RF) interface. The electrical coupling can be based on communication of high frequency radio waves over an air medium.

The connector 230 can also include a joint assembly 237 for allowing the accessory 200 to rotate to an orientation that is approximately flush with the communication device 100. That is, the sensors 220 can be positioned approximately flat with a surface of the communication device 100, such as the keypad. The joint 237 can be a pin and socket connector that allows a user to raise or lower the first and second appendage of the accessory 200. In such regard, this allows the user to adjust a location and sensitivity of the sensing space 101. In practice, the sensing space 101 extends from just above the sensors 220 to about 10 cm above the sensors. In such arrangement, a user can hold the communication device 100 with one hand, and use the thumb of that hand for touchless control of the mobile device. Alternatively, the user can use a finger of a second hand for operating the mobile device via touchless control. The accessory 200 is most sensitive to finger movement just above the first and second appendage and up to approximately 10 cm. It should be noted that the orientation and the location of the sensing space 101 relative to the sensors can be a function of placement, direction, and positioning of the accessory 200.

Notably, the sensing space 101 allows for sensory detection of a finger movement on a surface of the communication device 100 or above the communication device 100. This is sufficiently distinct from touchscreen or touchpad technologies. Capacitive based touchscreen or touchpad sensing can be employed for touchscreen and touchpad technologies. As an example, surface Acoustic Wave (SAW) capacitive touchpads are based on the premise of sending high frequency waves along a direct signal path of capacitive touchscreen along a surface of the touchscreen. When the screen is touched, a slight depression is formed which allows for the detection of a location of a finger on the touchscreen. A user can place a finger just above the touchscreen to initiate touchless control with barely touching the screen. Typically, the capacitance increases as a finger approaches the touch surface, and further increases as the finger presses on the touch surface. However, the sensing field for capacitive touchscreens is generally limited to the surface of the touchpad or the touchscreen. The detection of finger movement for capacitive based technologies is also generally limited to two dimensional sensing since it is based on a proximity to a surface of a touchscreen or touchpad. Such technologies do not allow for a significant displacement of the sensing space beyond the surface, or near surface, of the touchscreen. That is, a depth component is limited to the depression of the touchscreen, of the capacitance sensitivity. In contrast, as illustrated in FIG. 3, the accessory 200 herein described creates a sensing space that is sufficiently above (e.g. 0 to 5 cm) a surface of the mobile device, display, or keypad. In one embodiment, the accessory 200 can create the sensing space 101 based on principles of pulse-echo detection which take into account multiple reflections and cumulative echoes returns. In such regard, a user can interact with the mobile device by issuing finger commands in a projected two dimensional surface or three dimensional space in addition to extending two-dimensional control to three dimensions. The depth dimension provide by the sensing space 101 also allows the controller to determine when an object, such as a finger or ear, approaches the communication device 100.

Figure 5:
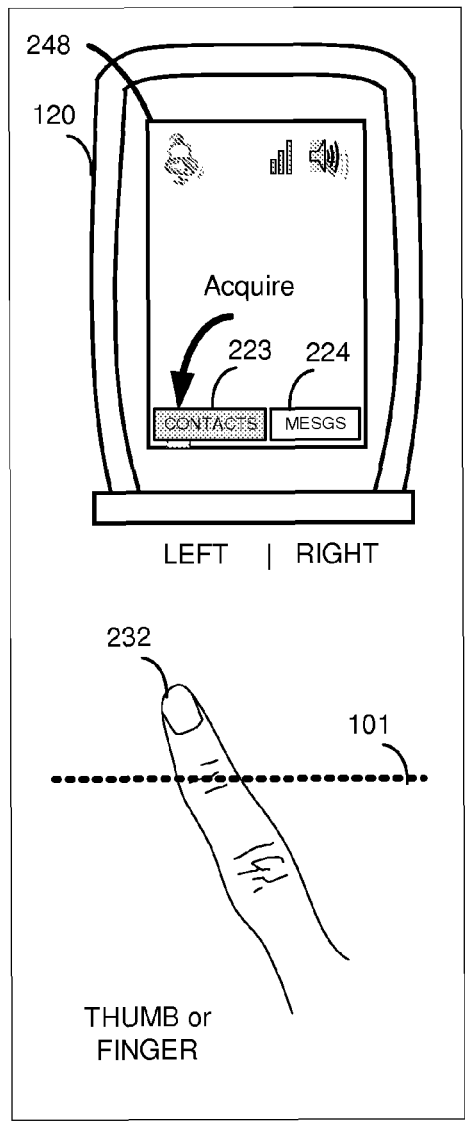
FIG. 5 is a touchless user interface for acquiring a control using the accessory in accordance with an embodiment of the inventive arrangements.

Referring to FIG. 5, an example application for touchless user interface control by the accessory 200 is presented. The GUI 248 can be presented on a display 120 of the communication device 100. In one arrangement, each location in the GUI 248 can be associated with a finger location in the touchless sensory space 101 or along a projected surface of a display. The location can be an absolute location such that a location of the finger 232 in the touchless sensory space 101 is associated with a location of an object control in the display 120. An object control may be the contact menu 223 or the message menu 224 in the display 120 but is not limited to these. The contacts menu 223 and the message menu 224 are presented as examples. The object controls in the GUI 248 can also be accessed via relative locations. That is, the finger 232 can select objects in the GUI 248 based on a relative movement and location of the finger in the sensing space 101. Accordingly, a finger moving in the touchless sensory space 101 can be associated with an object control in the GUI 248 via absolute positioning of the finger or relative positioning of the finger. The contact control 223 and the message control 224 may open up more menus upon selection. In practice, a user can press a soft key on a keypad of the mobile device to initiate touchless sensing mode. In touchless sensing mode, the user can point the finger 232 to the left to acquire the contact control 223, or the user can point the finger 232 to the right to acquire the message control 224. The accessory 200 can either determine that the finger is located on a left or a right side (e.g. absolute positioning), or that a movement of the finger is to a left direction or a right direction (e.g. relative positioning). Upon detecting the location or movement of the finger 232, the accessory can highlight the object control associated with the touchless action to signify an acquire condition. For example, the contacts control 223 can be illuminated when the finger points to the left. In this case, the user has acquired a control.

Figure 6:
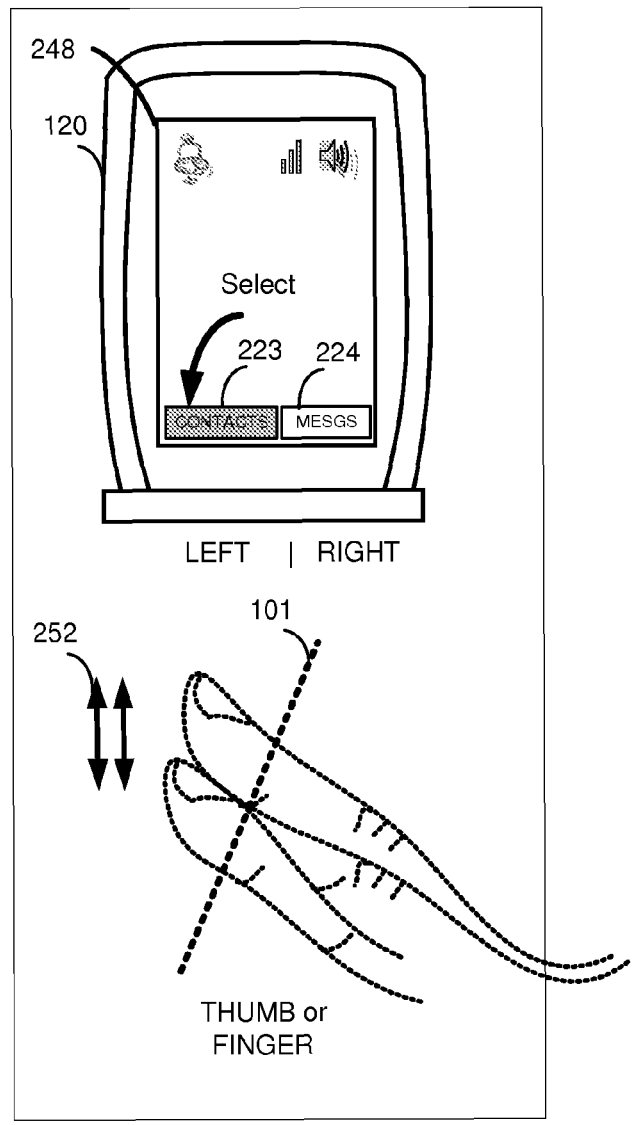
FIG. 6 is the touchless user interface of FIG. 5 for selecting a control using the accessory in accordance with an embodiment of the inventive arrangements.
Figures 7, 8:
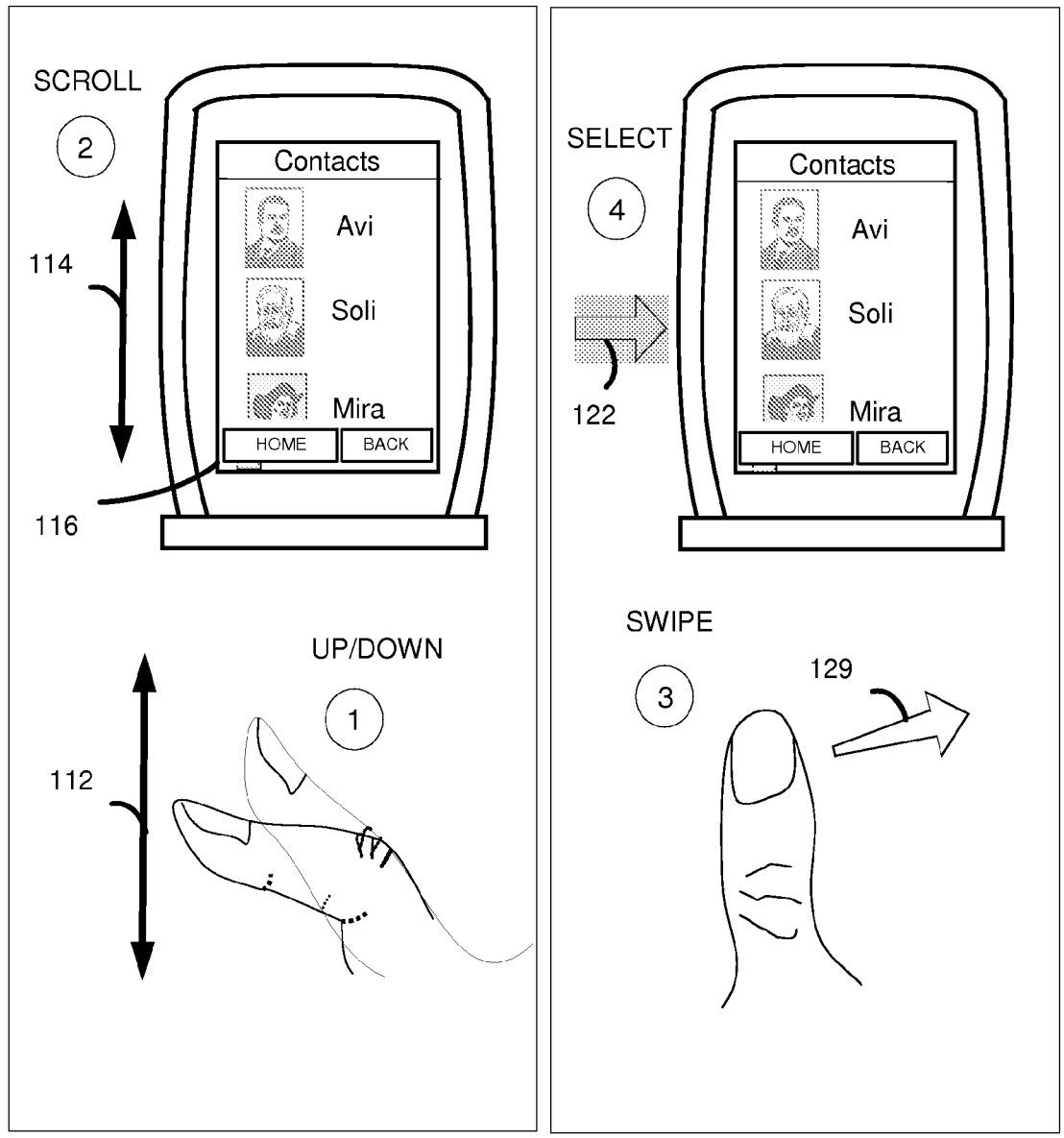
FIG. 7 is another touchless user interface for acquiring a control using the accessory in accordance with an embodiment of the inventive arrangements.
FIG. 8 is the touchless user interface of FIG. 7 for selecting a control using the accessory in accordance with an embodiment of the inventive arrangements.

As illustrated in FIG. 6, upon acquiring the contacts control 223, the user can proceed to select the contacts control 223 by issuing an up and down finger movement 252. The user can issue other finger movements, such as a left right jitter movement, and is not limited to the finger movements commands described herein, only as example. The user can select finger commands to associate with acquire and which finger commands to associate with select. In response to detecting the up and down finger movement, the accessory 200 can select the contacts control 223. The contacts control may include a list of contacts such as phone numbers and corresponding names but is not limited to such. Upon selecting the contacts control 223, a contacts menu can be presented, as seen in FIG. 7. A user can scroll 114 through the contact list by issuing an up and down finger movement 112, or a rotational finger movement. For example, a user can perform a circular clockwise movement or anticlockwise movement for scrolling the list. Notably, the accessory 200 determines what finger movements are associated with control actions depending on the GUI 248 exposed. In the contacts menu, the accessory 200 associates the up and down finger movement 112 with a scrolling action. The user can then select a contact entry 122 in the contact list by performing a finger swipe motion 129 as seen in FIG. 8. A finger swipe motion is an accelerated movement along an approximately constant direction. Upon detecting the finger swipe movement 129, the accessory can select the contact entry 122 associated with the scrolling 114.

As described, the touchless user interface created by the accessory 200 allows a user to navigate one or more menus in a display of the communication device 100 via touchless finger actions. For instance, a user can scroll 114 through menu entries on a menu list by issuing touchless finger commands in the air. The user can move a finger up and down in a sensing space created by the accessory 200 for scrolling the menu list. As an example, the user can select an entry by abruptly moving the finger 129 in a certain direction. As another example, the user can trace out patterns in the touchless sensing space. The accessory 200 can recognize a pattern from the finger movement in the air, and send the pattern to the communication device 100. Other example applications for use with touches user interface control are herein contemplated.

Figure 9:
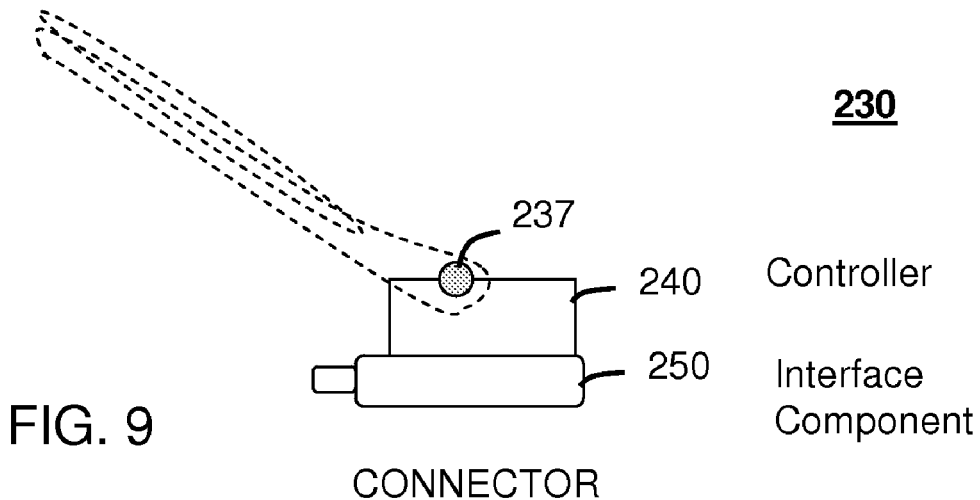
FIG. 9 is a connector of the mobile device accessory in accordance with an embodiment of the inventive arrangements.

Referring to FIG. 9, the connector 230 is shown in greater detail. The connector 230 can be a plastic mold having an embedded controller 240 and an interface connector 250, though is not limited to such. In one arrangement, the controller 240 may be external to the device and coupled to the accessory 200. The controller 240 can interpret the sensory signals and determine a location and a movement of a finger in the touchless sensing space 101. In one aspect, the controller 240 can trace a movement of the finger, recognize a pattern from the movement, and send the pattern to the mobile device. In another aspect, the controller 240 can recognize finger gestures and send control commands associated with the finger gestures to the communication device 100. The interface component 250 can be operatively coupled to the controller 240 for providing structural support, wherein the interface component is attachable to the mobile device. The interface component 250 can hold the at least one appendage to the communication device 100 such that the sensors are along a periphery of the mobile device. Alternatively, the controller 240 can pass finger position information to the communication device 100, which can then detect the pattern to adjust the corresponding control.

Figure 10:
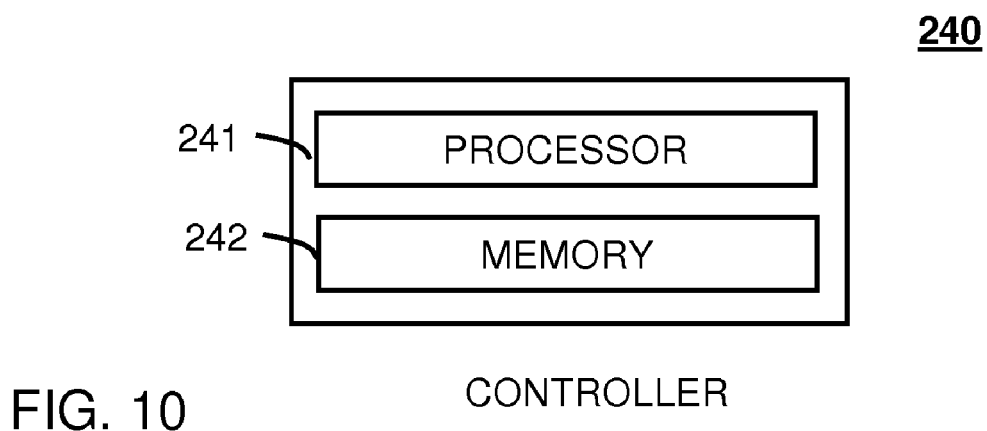
FIG. 10 is a block diagram of the processing components for the mobile device in accordance with an embodiment of the inventive arrangements.

Referring to FIG. 10, the controller 240 is shown in greater detail. The controller 240 can include a processor 241 and a memory 242 (e.g. programmable readable storage medium) but is not limited to having either. The processor 241 in one embodiment can determine the location and movement of the object (e.g. finger) in accordance with principles of pulse-echo detection. The memory 242 can store a history of the location and the movement. The processor 241 and memory 242 can receive power from the mobile device through the interface component 250. In one arrangement, the processor 241 and the memory 242 can be within the mobile device 200. The mobile device 220 can perform signal processing techniques associated with identifying a location and movement of a finger in the sensing space 101 created by the accessory 200. In the arrangement shown, the processor 241 and the memory 242 are external to the mobile device 200 and are embedded within the connector 230. Briefly, the processor 241 may be a micro-processor, a Digital Signal Processor, a custom Application Specific Integrated Circuit (ASIC), or any other suitable electronic device. Software can be included on the processor 241 for performing function specific to location and movement detection. For example, the processor 241 can have an assembler core wherein assembly code or C code can be written specific to the processor 241. The processor 241 can save a history of finger location and movement information in the memory 232. The memory 230 may also contain variables and parameters for performing touchless sensing in accordance with the embodiments of the invention.

As an example, in one arrangement, the communication device 100 can expose a Java Applications Programming Interface (API) for allowing data to be sent or received through a port of the mobile device. The interface component 250 can provide a serial connection or a USB connection to the Java API through the port of the mobile device. The interface component 250 can provide an electrical connection to communication device ports of the communication device 100. In practice, a manufacturer of the mobile device may implement native calls to underlying hardware on the mobile device. The underlying hardware can be physical or logical ports or socket connections on the communication device 100. Certain manufacturers comply with Java API specification to expose the underlying hardware functionality. The processor 240 can perform a handshake with the communication device 100 through the Java API. For example, Java Standards Recommendation (JSR) 135 and (JSR) 237 specify methods for exposing multimedia functionality to external devices. The processor 240 can implement native commands for communicating with the Java API in accordance with the standards recommendations. In such regard, the processor 240 can send commands to the mobile device for controlling mobile device behaviors.

As an example, the controller 240 can expose a Java API for providing touchless input pointer events such as a finger gesture or a finger movement. For instance, an input pointer event may be a direction and displacement of the finger, such as left 10 pixels, right 1 cm, or forward 20 pixels. An input pointer event may be a finger swipe, a jitter movement, a back and forth sweep, a pause motion, an abrupt pull away motion, or any other finger action. An input pointer event may also be associated with a touchless gesture. For example, a user may train the accessory 200 to recognize a finger gesture. The accessory 200, upon recognizing the finger gesture can send a hot-key command to the mobile device for performing a control action to registered command listeners.

In such arrangement described, the processor 240 can expose a touchless pointer interface. The touchless user interface can interpret finger movements in the sensing space, and send commands to the mobile device associated with the finger movement. Moreover, the accessory 200 can support command listener events wherein programs can register to receive input pointer events. An input pointer event can be a movement of a finger in an x, y, or z direction or a differential movement such as dx, dy, and dz. A pointer event can also be an accelerated movement such as a finger swipe. A pointer event can also be associated with a boundary of the sensing space. As one example, a command listener can await for commands based on a location of the finger in the sensing space 1010. In one example, the accessory 200 can send a trace of finger movement to the mobile device, and the communication device 100 can draw a trace of the finger based on the trace. For instance, a user can draw an alpha-numeric character in the air in the touchless sensing space 101, and the accessory 200 can send the trace of the alphanumeric character to the mobile device via the interface component.

Briefly referring back to FIG. 1, the sensory device as shown can include the removable touch-panel 106 with displayed user interface controls, suitable for attachment to the communication device 100. The controller 240 projects a sensing field onto a surface of the removable touch-panel 106 in accordance with the displayed user interface controls such that a finger positioning or movement on a user interface control on the surface of the removable touch-panel 106 corresponds to at least one command action to control the user interface of the communication device 100. The controller 240 can recognize finger gestures and send control commands associated with the finger gestures to the communication device 100.

The controller can also determine a layout of the displayed user interface controls associated with different removable face plate in response to identifying the removable face plate 106. For example, the removable face plate 106 can include a magnetic strip, electronic element, or other signature that identifies the removable face plate 106. The controller 240 upon reading the signature can determine the layout of user interface controls and accordingly interpret the finger location and movements with the user interface controls of the removable face plate 106. In such regard, different removable face plates can be used for different applications. Moreover, the controller 240 can detect a switching out a face plate and thus support multiple user interfaces. For example, a different removable face plate can correspond to a graphical user interface on a display of the communication device 100 presenting a media panel, an email panel, a voice mail panel, or an Internet panel.

Figure 11:
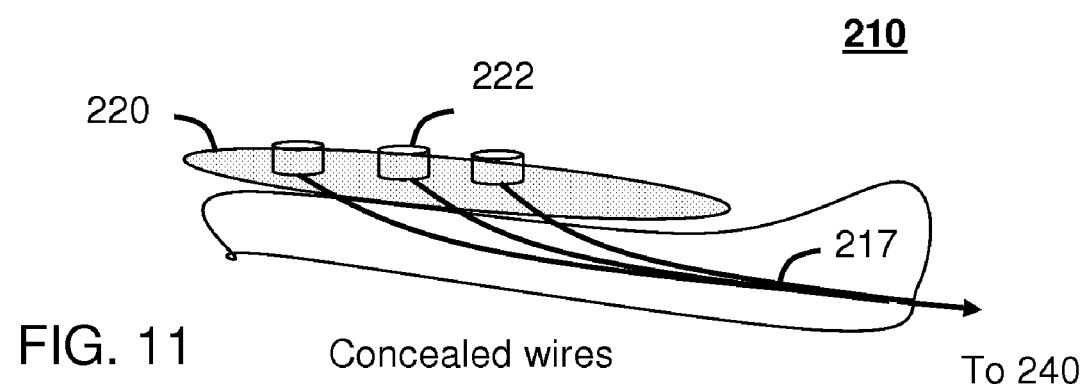
FIG. 11 is an appendage of the mobile device accessory showing sensors in accordance with an embodiment of the inventive arrangements.

Referring to FIG. 11, the first appendage 210 is shown in greater detail. In particular, the sensor 220 of the appendage can include one or more sensor elements 222. The second appendage 211 can be similarly constructed with sensors. As an example, the sensors can detect a finger that is just above a surface of the communication device 100 and upwards of 5-6 cm away from the communication device 100. The sensor elements 222 may be ultrasonic elements, charge coupled devices (CCDs), optical elements, laser elements, surface acoustic wave elements, CMOS floating gates, or infrared elements for monitoring a movement of the finger in the sensing space. In one aspect, the touchless sensing space can be created by surface acoustic wave elements in the first appendage and the second appendage. In another aspect, the touchless sensing space can be created by ultrasonic transmit and receive sensors in the at least one appendage. In one arrangement, the receive sensors can be micro-electro mechanical (MEMS) microphones. The appendage 210 can conceal wires connecting the sensor elements 222 to the controller 240.

Figure 12:
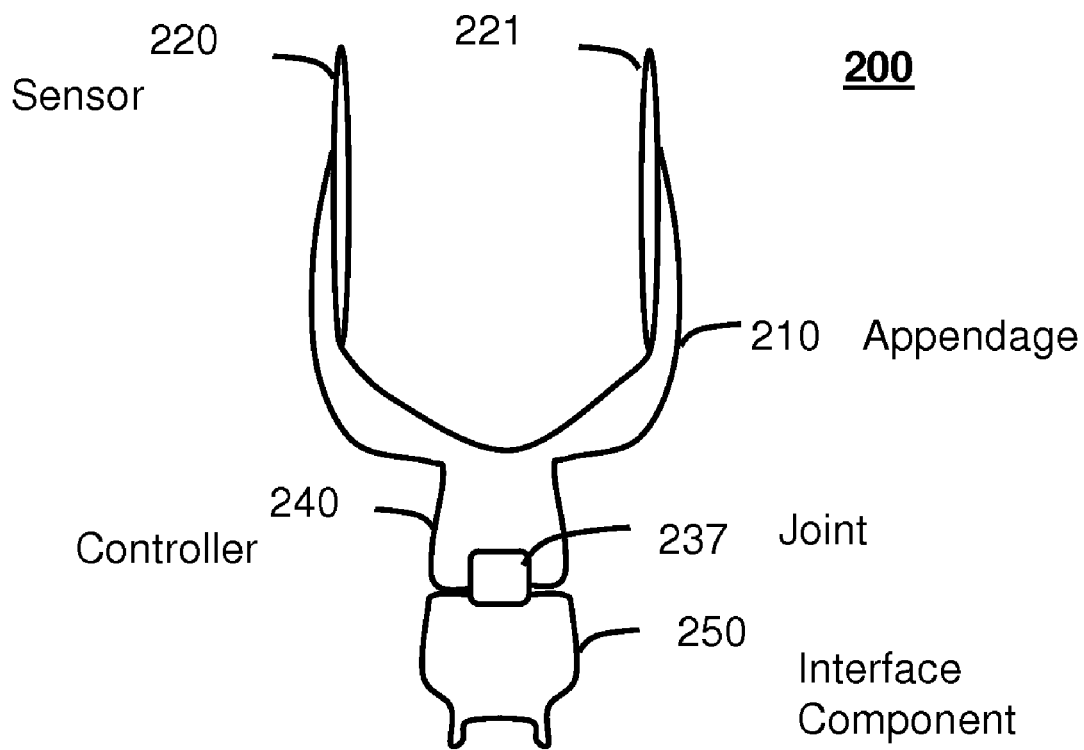
FIG. 12 is a plastics design for the mobile device accessory in accordance with an embodiment of the inventive arrangements.

Referring to FIG. 12, an exemplary depiction of the accessory 200 is shown. In one arrangement, the accessory 200 can be manufactured via plastic mold injection or any other suitable manufacturing process as is known in the art. The controller 240 and the interface component 250 can be embedded within the plastic so as not to be directly visible to the user. The joint 237 provides for a rotation of the interface component 250 and the controller 240 as shown in FIG. 9. This also allows a user to orient the sensing space 101 with respect to the communication device 100. As shown, the sensors 221 and 222 can be aligned along a first side (e.g. left) and a second side (e.g. right) for operation with a mobile device.

Figure 13:
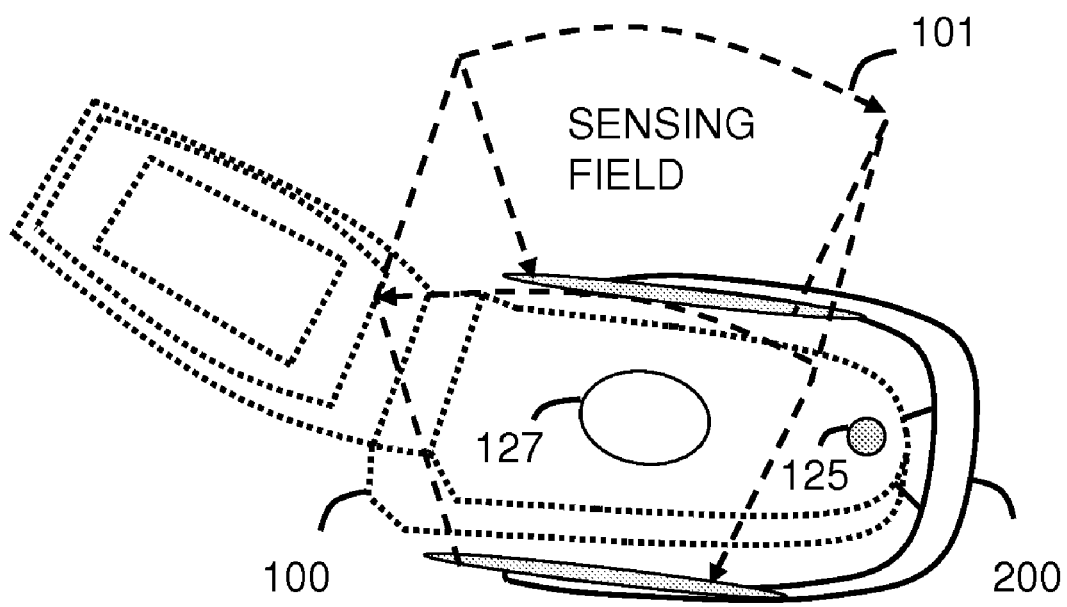
FIG. 13 is an illustration of a touchless sensing space in accordance with an embodiment of the inventive arrangements.

Referring to FIG. 13, a perspective view of the accessory 200 for coupling with a communication device 100 is shown. In one arrangement, the sensors 220 and 221 can create the sensing space 101 above the communication device 100. In another arrangement, the communication device 100 can provide sensor elements to be used in conjunction with sensors 220 and 221 of the accessory 200. For example, the communication device 100 can include a microphone 125 which can be communicatively coupled to the processor 241 of the accessory 200. As an example, the microphone 125 can be sufficiently sensitive to capture ultrasonic signals which are high frequency audio signals in the range of 30 KHz to 150 KHz. The communication device 100 may also include an ultrasonic transmitter 127 which can be between keys of a keypad on the communication device 100. The transmitter can also reside on an appendage of the accessory 200. The transmitter 127 can also be embedded at other locations in the mobile device and directed to a location where a user's finger can be positioned to initiate touchless sensing.

Figure 14:
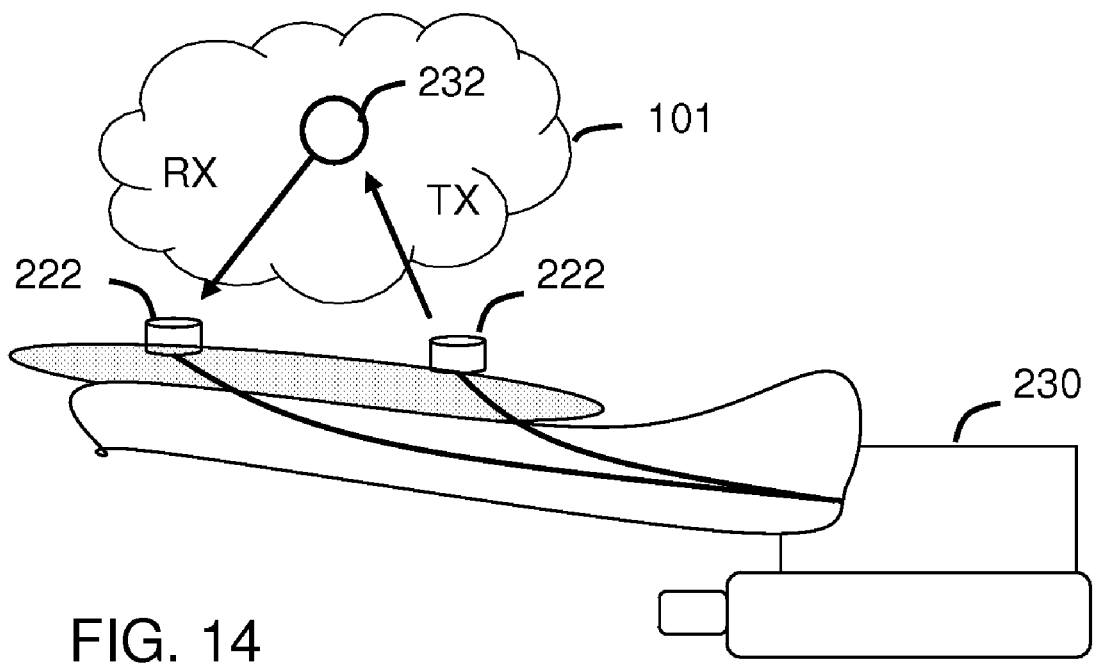
FIG. 14 is a side view of the mobile device accessory having a first sensor layout for providing a touchless sensing space in accordance with an embodiment of the inventive arrangements.

Referring to FIG. 14, a side view of the accessory device 200 showing the first appendage 210 and the connector 230 is shown. In this arrangement, the at least one joint 237 allows the appendage 210 to rotate. In another arrangement, the connector 230 may not include a joint, and may be in a fixed position. In such regard, the accessory 200 connects to the mobile device without adjustment thereby keeping the sensors 220 and 221 at a fixed location relative to the communication device 100. The sensors 222 are shown enlarged for illustration. When an object 232, such as a finger is within the sensing space 101 (See FIG. 3), the controller 240 can detect a location and/or a relative movement of the finger 232 from signals received at the sensors 222. In one exemplary arrangement, the sensors 222 are ultrasonic elements that can transmit and receive high frequency signals. For example, a first sensor can transmit a 40 KHz constant modulated or frequency modulated pulse, and a second sensor can receive a reflection off the pulse off the finger 232.

Figure 15:
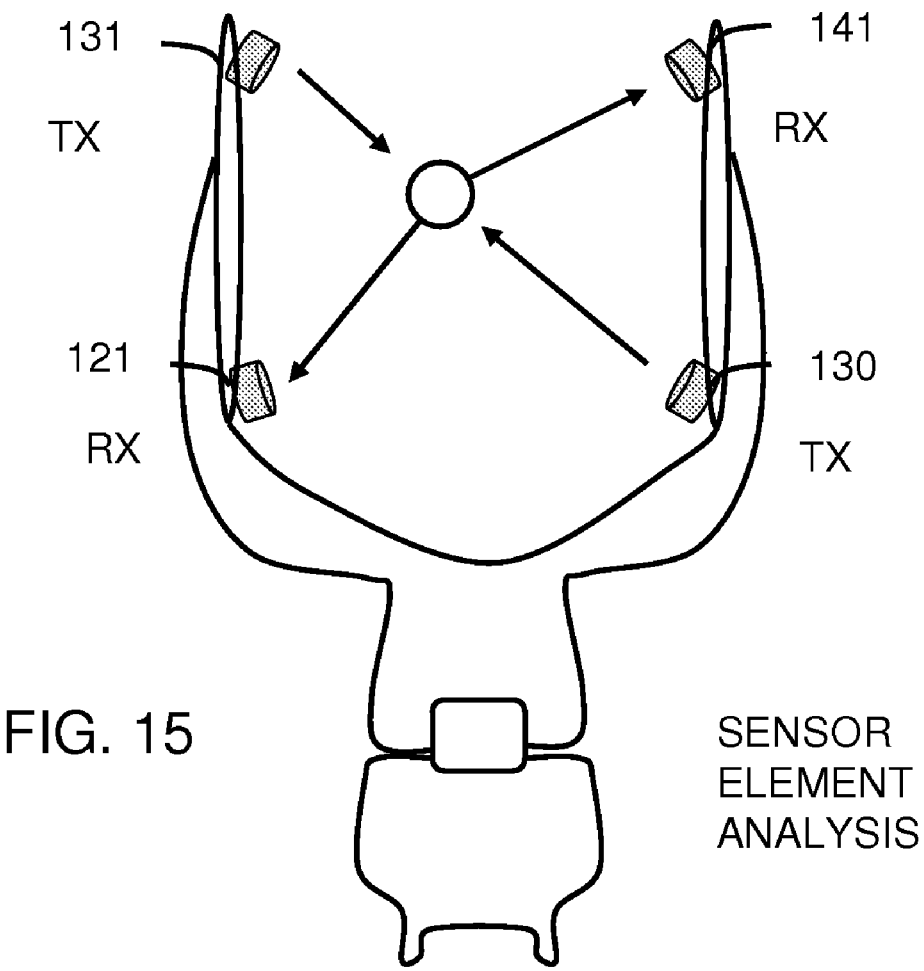
FIG. 15 is an exemplary sensor layout of the mobile device accessory for tracking a finger in accordance with an embodiment of the inventive arrangements.

Referring to FIG. 15, an illustration of the accessory device 200 for detecting the location of a finger 232 is shown. The accessory can include multiple sensor elements such as a transmitter 130 and a receiver 141 on a first appendage, and a second transmitter 131 and a second receiver 121 on a second appendage. The transmitter 130, the first receiver 121, and the second receiver 141 can operate to provide a first pulse-echo detection for locating a position and movement of the finger. Notably, more than the number of sensors shown can be included for increasing a tracking resolution. For example, an array of MEMS sensors can be deployed to track the finger. At a first time, the first pulse-echo detection can identify a first location and movement. At a second time, the transmitter 131, the first receiver 121, and the second receiver 141 can operate together to provide a second pulse-echo detection. Upon processing the first pulse-echo detection and the second pulse-echo detection, the processor 241 can identify a location or movement of the finger 232. That is, multiple receivers can be employed to determine a location of the finger based on staggered echo-pulse detection. For example, at a first time, a first location will be determined. At a second time, a second location will be determined to confirm the first location. The first transmitter 130 and the second transmitter 131 can operate within a small interval of time such that the location of the finger is considered constant in the interval. In such regard, a location of the finger 232 can be verified via multiple pulse-echo readings. The first transmitter 130 and the second transmitter 131 perform in staggered operation, such that any residual reflections of a pulse are sufficiently small such as not to affect a staggered reading. Also, the staggering of the pulse transmissions by the first 130 and second 130 transmitter provide for detection of the finger 232 in three-dimensions.

Figure 16:
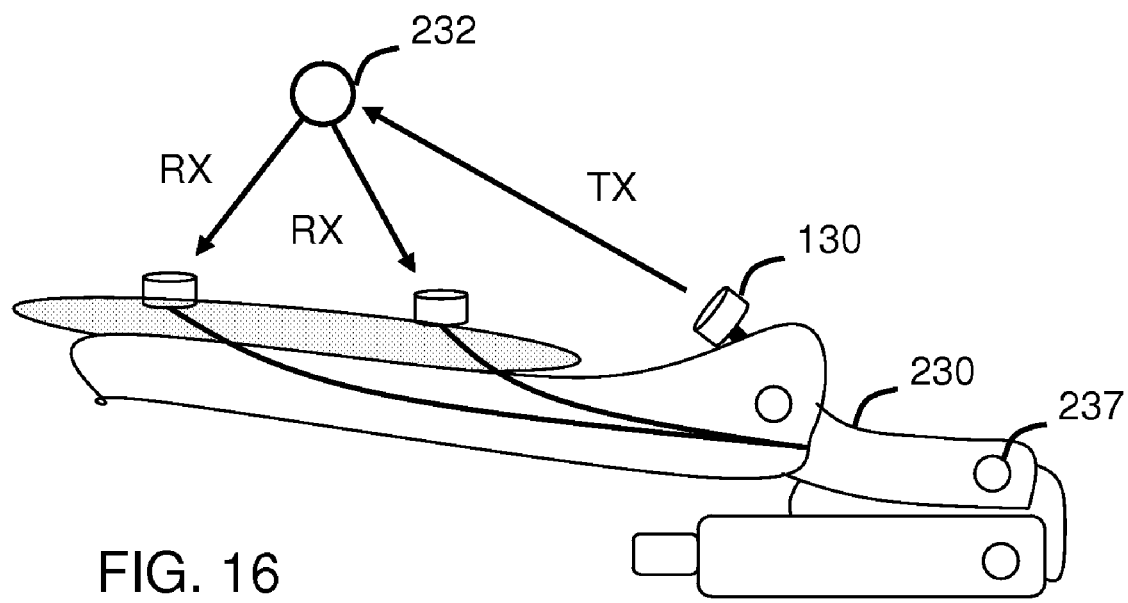
FIG. 16 is a side view of the mobile device accessory having a second sensor layout for providing a touchless sensing space in accordance with an embodiment of the inventive arrangements.
Figure 17:
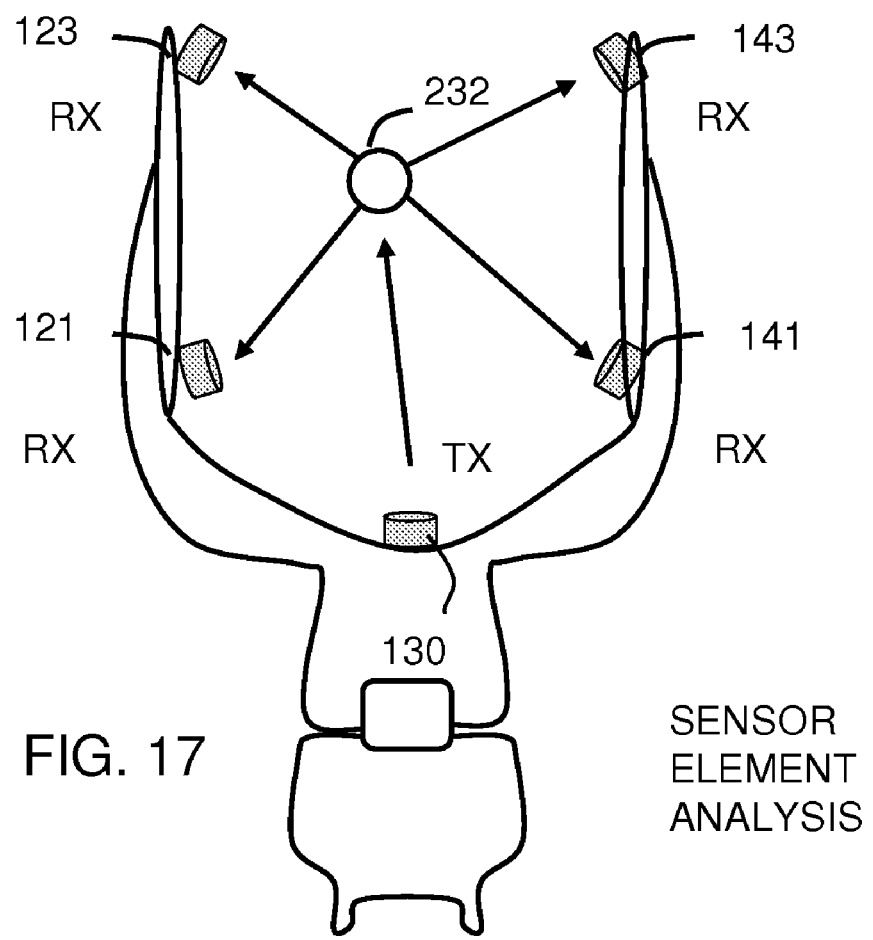
FIG. 17 is an exemplary sensor layout of the mobile device accessory for tracking a finger in accordance with an embodiment of the inventive arrangements.

In another arrangement, only one transmitter 130 is used for providing three-dimensional sensing. Referring to FIG. 16, a side profile of the accessory 200 is shown. Notably, a transmitter 130 can be included at a base location. Referring to FIG. 17, a layout of the sensor elements is shown. The transmitter 130 can emit a pulse which can reflect off the finger 232. A first pair of receivers (121 and 141) can receive the location, and the processor 241 can estimate a first loci of points corresponding to where the finger 232 can be. Notably, the use of only one transmitter and two receivers confines the search space from three dimensions to two dimensions. The second pair of receivers 123 and 143 result in a second estimate of the location of the finger 232 that defines a second loci of points where the finger can be located. The intersection of the first loci of points and the second loci of points results in a one dimensional location where the finger can reside. In such regard, the dual paired arrangement (121/141) and (123/143) allow for a detection of the finger 232 in three dimensions. Notably, the transmitter 130 is not limited to the position shown, though the symmetrical arrangement reduces aspects of computational complexity. The transmitter 130 can be placed anywhere on the accessory 200. Given at least three receivers, a location of the finger 232 can be determined for providing three controls. For example, a movement of the finger in the X, Y, and Z direction can be mapped to three controls. Given at least two receivers, two controls can be provided. For example, a movement of the finger along an X and Y direction can be mapped to two controls. A third control is possible when at least three receivers are employed.

Figure 18:
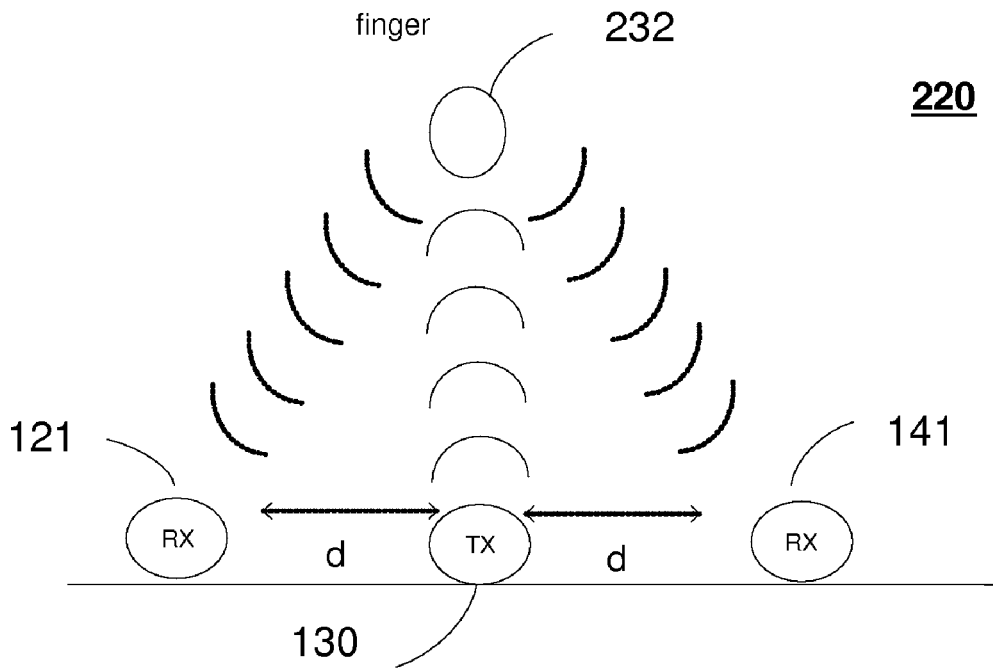
FIG. 18 is an illustration for pulse-echo detection for tracking a location and movement of a finger in a touchless sensing space in accordance with an embodiment of the inventive arrangements.
Figure 18:
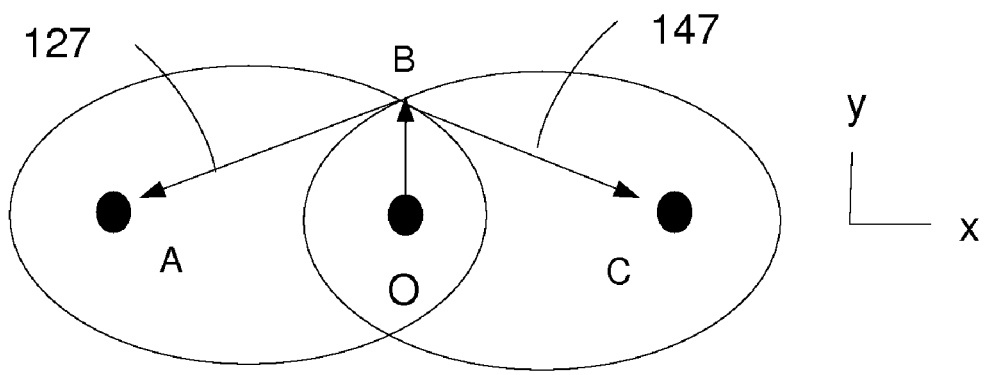

Referring to FIG. 18, an illustration showing principles of touchless sensory detection for operation in accordance with the sensor layouts of FIG. 15 and FIG. 17 is shown. Recall, the first appendage can include sensor elements 222. At least one sensor element can be a transmitter 130 and at least two sensors can be receivers 121 and 141. The transmitter 130 may also be one of the receivers. Moreover, the receivers may also perform as transmitters. As an example, signal path reflections for the left receiver 121 and the right receiver 141 are shown for illustrating principles of transmit and receive operation. The transmitter 130 and receivers 121 or 141 can be the same element for providing dual transmit and receive functions. In one arrangement, the sensors (130, 121 and 141) can be an array of ultrasonic transducers, micro-acoustic microphones, micro speakers, or micro-electro mechanical MEMS microphones for transmitting and receiving audio signals. In another arrangement, the sensors can be CCD camera elements, optical elements, LED elements, or MEMS camera elements for receiving light.

In the case of using ultrasonic sensing elements, the sensor 220 can employ pulse-echo detection to estimate a range and position of the finger 232 within view of the sensor elements. In this arrangement, the transmitter 130 emits a pulse signal that reflects off the finger 232, which is detected by receiver element 121 and receiver element 141 in the sensing unit. Notably, multiple receivers and transmitters can be employed to improve the signal to noise and detection capabilities of the accessory 200. As an example, a rotation of transmitting and receiving actions can be performed by the sensors to improve detection resolution. The receiver elements 121 and 141 can be coupled with the processor 241 (See FIG. 10) to detect a signal reflected off the finger 232. The processor 241 can include additional processing logic such as thresholds, comparators, logic gates, clocks, and the like for detecting the finger's position and motion in accordance with pulse echo range detection. In practice, the processor 241 in combination with the sensor 220 can calculate a position of the finger 232 based on a plurality of reflections by solving a series of geometric equations.

For example, time of flight measurements OBA 127 and OBC 147 are shown. The time of flight measurements establish an intersection of two ellipses. During operation, the processor 241 calculates a first range of the finger 232 using the transmitter 130 and receiver 121. The first range 127 can be determined by calculating the first time of flight OBA 127 between the signal transmitted at the transmitter and the echo of the signal reflected off the object 310 received by the receiver 121. The second range 147 can be determined by calculating a second time of flight OBC 147 between the signal transmitted at the transmitter and the echo of the signal reflected off the finger 232 received by the receiver 141. The processor 241 (See FIG. 10) can estimate a position (e.g. location) of the finger 232 causing the signal reflection by mathematically combining geometrically related range measurements.

Figure 19:
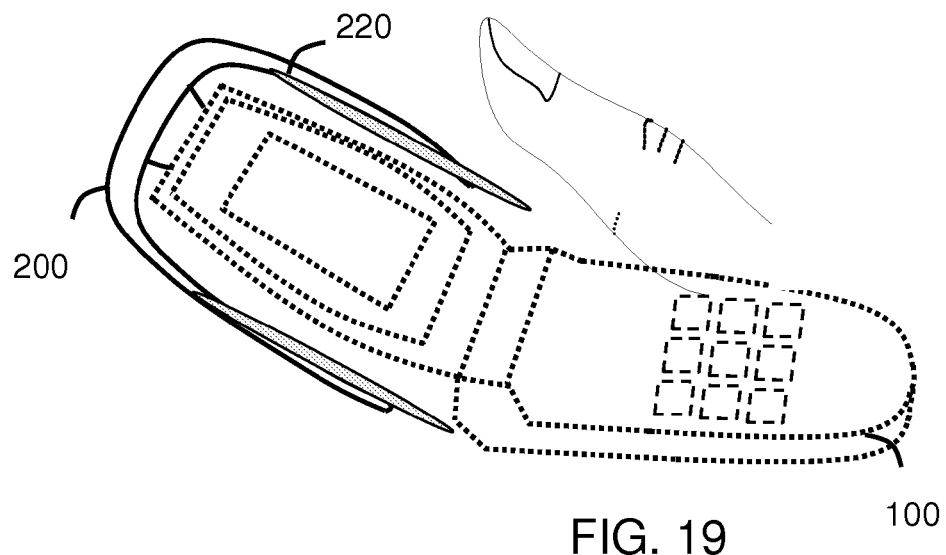
FIG. 19 is a depiction of the mobile device accessory used in a display arrangement for providing a touchless screen in accordance with an embodiment of the inventive arrangements.

Referring to FIG. 19, the accessory 200 can be coupled to a display of the communication device 100. In particular, the first appendage (210) and the second appendage (211) containing the sensors 220 can be positioned around a display of the mobile device. A user can interact with the mobile device over the display by moving a finger in the touchless sensing space, without touching the display. In such regard, the accessory 200 provides a virtual touchscreen to the mobile device. The virtual touchscreen offered by the sensing space 101 provides three dimensions of control: left, right, forward, back, up and down. In practice, the accessory 200 can determine any direction of movement which can also be specified as angular or polar coordinates. The accessory 200 is not limited to only up, down, left, right, back, and forth movements. Notably, any direction can be identified, and these are presented for supporting standard game controls. In another arrangement, the accessory 200 can project the sensing space 101 onto the display so as to render the display as a touch-screen display. User interface controls in the display are mapped to virtual controls in the sensing space 101.

The virtual touch-screen controls can interface to the mobile device for providing virtual interaction with a menu system or game. For example, a virtual reality game can be played on the phone wherein a user can move left, right, forward, back, and up and down, or diagonal, in an environment of the virtual game. Notably, the accessory 200 can identify an absolute location or a relative location of the finger in the sensory space 101, and send the location information to the mobile device through the interface component 250. For example, the processor 240 can send an x, y, or z location (i.e. Cartesian coordinate), or a dx, dy, or dz value to the mobile device. In another arrangement, the processor 240 can identify a direction of finger movement and send the direction information to the communication device 100. In such regard, the communication device 100 only need receive a command to perform an action, such as an up and down command to scroll a menu or move a player in a virtual game.

Figure 20:
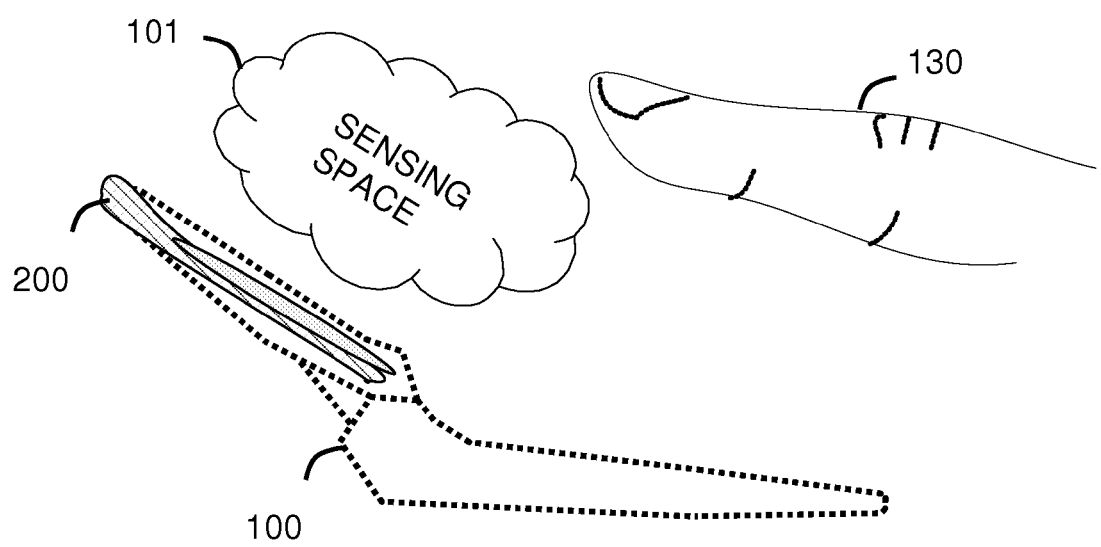
FIG. 20 is a side view of the mobile device accessory of FIG. 19 in accordance with an embodiment of the inventive arrangements.

Referring to FIG. 20, a side view of the accessory device as coupled to a display portion of the mobile device is shown. In particular, the touchless sensing space 101 is above the display. The touchless sensing space can be a volumetric region such as a three dimensional volume for detecting a location and movement of a finger. In such regard, the accessory 200 can provide three dimensions of control to the communication device 100.

Figure 21:
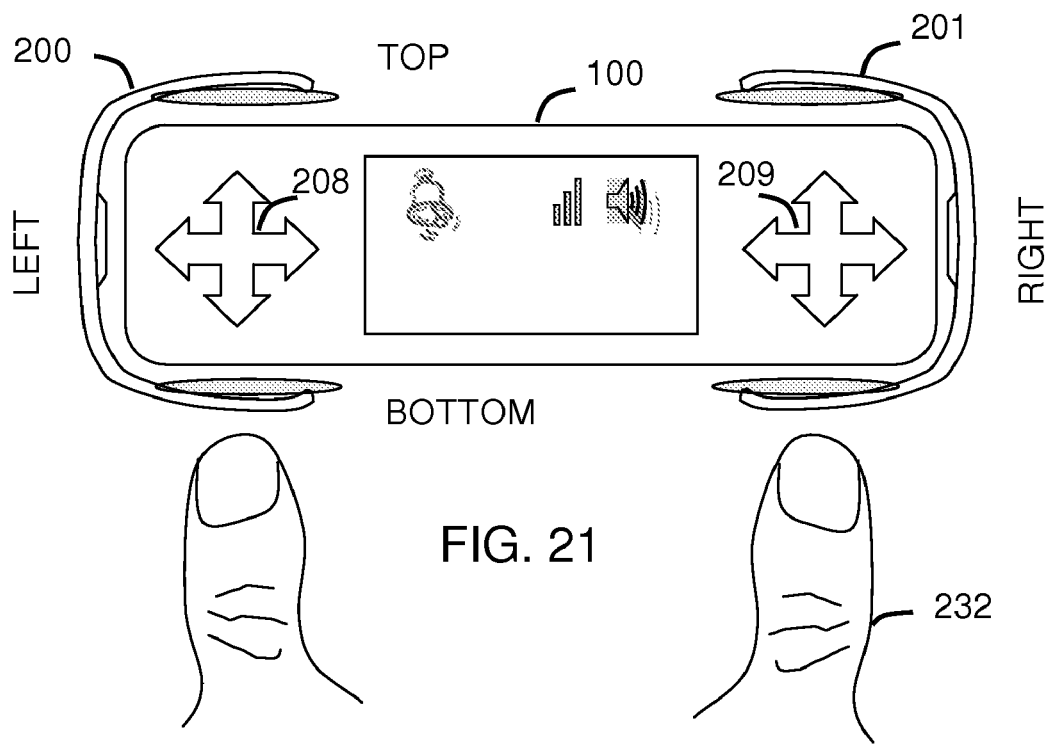
FIG. 21 is a depiction for the mobile device accessory used as a game control for providing a dual touchless user interface in accordance with an embodiment of the inventive arrangements.

Referring to FIG. 21, a game control application is shown incorporating a first user interface accessory 200 on a first side, and a second user interface accessory 201 on a right side. Notably, the first user interface accessory 200 on the left side provides a touchless sensory interface to a hand operating the device on the left, and the second user interface accessory 201 on the right side provides a touchless sensory interface to a hand operating the device on the right. A user handling the mobile device in a gaming application can extend a left thumb over a navigation pad 208, and a right thumb over a second navigation pad 209. The user interface accessory 200 and 201 can provide a third dimension to game control. The third dimension of control can be provided by raising the finger above the navigation pad. For example, a user can issue a fire command by raising the finger, or any other control command. The third dimension provided by the user interface accessory 200 and 201 can complement control provided by the navigation pads 208 and 209. In another arrangement, full three dimensional control can be provided.

Figure 22:
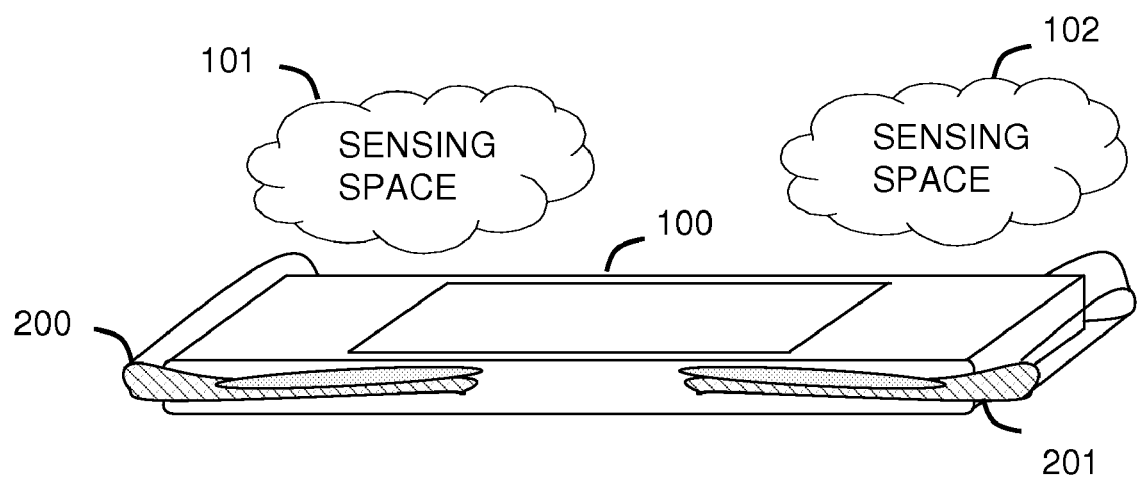
FIG. 22 is a side view of the mobile device accessory of FIG. 21 for a game control arrangement in accordance with an embodiment of the inventive arrangements.

Referring to FIG. 22, a side view of the user interface accessory 200 and user interface accessory 201 is shown. In particular, the appendages of the user interface accessory 200 and 201 are approximately flush with a surface of the mobile device. In such regard, the appendages do not obstruct normal handling of the communication device 100. The first user interface accessory 200 can provide a first sensing space 101, and the second user interface accessory can provide a second sensing space 102.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

Figure 23:
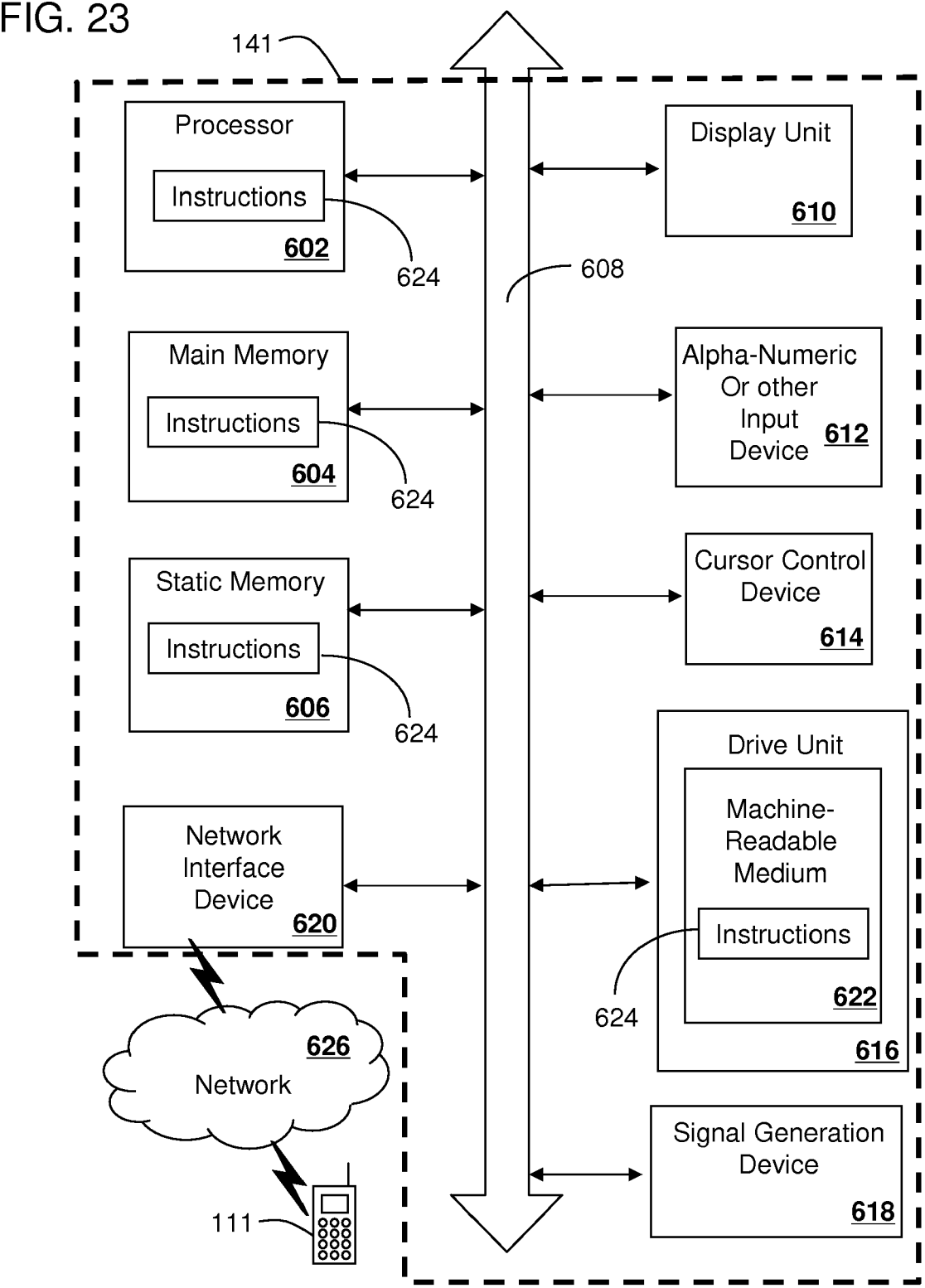
FIG. 23 is a is a diagrammatic representation of a machine in the form of a computer system within which a set of instructions, when executed, may cause the machine to perform any one or more of the methodologies discussed herein.

For example, FIG. 23 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A sensing system, comprising
   a sensing device, comprising
      a first array of sensors and a second array of sensors, wherein the first array and the second array produce a touchless sensing space that projects above a surface of a communication device;
   a connector to the communication device that provides for a raising, lowering and orienting of the sensing device to adjust a location and sensitivity of the touchless sensing space; and
   a controller operatively coupled to the first array and the second array for:
      interpreting sensory signals from the sensors, determining a finger location and movement in the touchless sensing space, mapping virtual user interface controls in the touchless sensing space to user interface controls of a removable face plate based on the finger locations and finger movements, and generating one or more command actions to control a user interface of the communication device according to the finger location and movement; and where the removable face plate displays user interface controls that are mapped to the virtual controls, suitable for attachment to the communication device, wherein the controller projects the touchless sensing space 0 to 5 cm or more above a surface of the removable face plate in accordance with the displayed user interface controls such that finger positioning or movement on a user interface control on the surface of the removable face plate corresponds to at least one command action to control the user interface of the communication device.

2. The sensing system of claim 1, wherein the removable face plate detachably snaps to the communication device.

3. The sensing system of claim 1, wherein the removable face plate includes displayed media controls for at least one among volume, equalization, song selection, stop, play, pause, fast forward, rewind, next, and forward.

4. The sensing system of claim 1, wherein the removable face plate includes an electronic element that identifies one or more different removable face plate.

5. The sensing system of claim 4, wherein the controller responsive to identifying a different removable face plate determines a layout of the displayed user interface controls associated with different removable face plate.

6. The sensing system of claim 4, wherein a different removable face plate corresponds to a graphical user interface on a display of the communication device presenting at least one among a media panel, an email panel, a voice mail panel, and an Internet panel.

7. A removable face plate with displayed user interface controls, suitable for attachment to a communication device, the removable face plate comprising:

an electronic element that identifies the removable face plate and a layout of user interface controls presented on the removable face plate, such that a sensing device, operatively coupled to the removable face plate and communication device, upon identifying the removable face plate projects a sensing field onto the removable face plate in accordance with the layout of user interface controls, and adjusts a location and sensitivity of the touchless sensing space by way of joint assembly attached thereto that provides for a raising, lowering and orientation of the sensing device, such that a finger positioning or movement on a user interface control of the removable face plate corresponds to at least one command action to control a user interface of the communication device.

8. The removable face plate of claim 7, wherein the communication device is at least one among a cell phone, media player, personal digital assistant, or laptop, and the sensing device provides sensory user interface controls for controlling the communication device in accordance with the user interface controls presented on the removable face plate.

* * * * *